Jan. 28, 1969 S. Z. SIWEK 3,423,918
GUARD AND DEFLECTOR PLATE FOR ROTARY LAWN MOWERS
Filed Jan. 19, 1966 Sheet 1 of 2

INVENTOR
STANLEY Z. SIWEK
BY Mason, Brown & McWilliams
ATTORNEYS

Jan. 28, 1969     S. Z. SIWEK     3,423,918
GUARD AND DEFLECTOR PLATE FOR ROTARY LAWN MOWERS
Filed Jan. 19, 1966                         Sheet 2 of 2

INVENTOR
STANLEY Z. SIWEK
BY Mann, Brown & McWilliams

ATTORNEYS

United States Patent Office 3,423,918
Patented Jan. 28, 1969

3,423,918
GUARD AND DEFLECTOR PLATE FOR ROTARY LAWN MOWERS
Stanley Z. Siwek, Chicago, Ill., assignor to Pioneer Gen-E-Motor Corporation, a corporation of Delaware
Filed Jan. 19, 1966, Ser. No. 521,623
U.S. Cl. 56—202
Int. Cl. A01d 53/08
4 Claims

ABSTRACT OF THE DISCLOSURE

A guard and deflecting plate for the discharge openings of rotary lawn mowers. A latch lever locks the plate in a closed position guarding the opening when a receptacle is removed from the opening. The plate is pivotally mounted on the mower so as to be movable to a full open position or a partially open position.

---

The present invention is directed to certain new and useful improvements in guard and deflecting structures for use with rotary lawn mowers having discharge openings on one side thereof as, for example, illustrated in United States patent application, Ser. No. 353,086 (now United States Patent No. 3,246,459, issued Apr. 19, 1966) of the present applicant and Harry Goldberg.

The major purposes of the present invention are to provide a new and effective guard means for the discharge opening from a rotary lawn mower so that the guard means automatically closes and obstructs the opening to the blade area whenever a receptacle is removed from the discharge conduit, the structure being so formed that the guard plate is easily moved to the open position by manipulation of the receptacle when the receptacle is repositioned over the discharge opening, the plate being so formed as to allow selectivity of use of the mower in mulching, windrowing, or collection of clippings, these and other purposes of the invention being more apparent in the ensuing specification and claims, when taken with the accompanying drawings, in which:

Like elements are designated by like characters throughout the specification and drawings.

Figure 1:
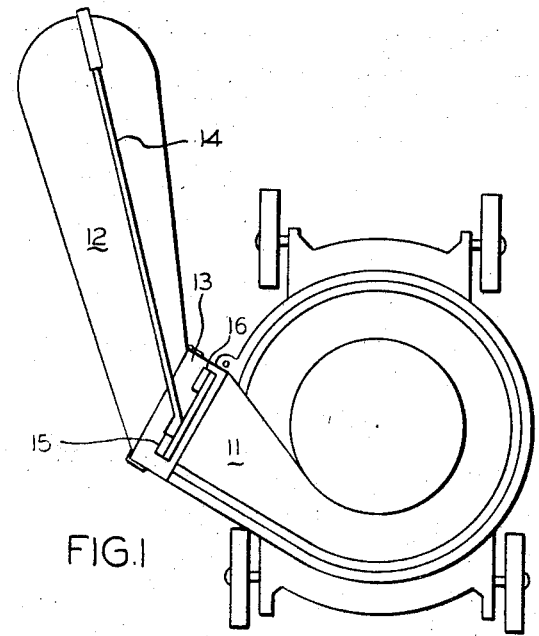
FIGURE 1 is a diagrammatic illustration of a typical rotary lawn mower which can be adapted to include the principles of the present invention.

With particular reference to the drawings and in the first instance to FIGURE 1, numeral 10 generally designates a rotary lawn mower of the class to which the present invention is applicable. As illustrated in FIGURE 1, the mower 10 includes a wheel supported base which may have a generally spirally formed channel on the under surface thereof for directing clippings through a discharge conduit 11 located at one side of the base. The discharge conduit, as illustrated, may be directed both laterally and rearwardly. A receptacle 12 is supported on conduit 11. The receptacle may include a metal frame 13 which overlies and surrounds the discharge end of the conduit and a handle 14 for manipulating the same. The metal frame may include spaced slots 15 and 16 to receive lugs 15a and 16a which are in spaced and upstanding relation on the upper wall of the discharge conduit 11. Rotary mower and receptacle systems of this class are more fully described and illustrated in United States patent application Ser. No. 353,086 (now United States Patent No. 3,246,459, issued Apr. 19, 1966) of the present applicant and Harry Goldberg.

When the receptacle 12 is full of clippings, it is removed from the mower simply by lifting upwardly on the handle to disengage the slots in the receptacle frame from the lugs. This, of course, leaves the discharge opening exposed. For reasons of safety, it is considered sound practice to stop the engine and cutting plate of the mower before the receptacle is disengaged. This is done to prevent clippings or other articles from being discharged through the opening when the receptacle is removed. Also, it minimizes the possibility of injury due to a person putting a hand or foot inside of the discharge opening.

In accordance with the present invention, a closure plate is provided for the discharge channel 11 to serve as a guard and closure for the opening when the receptacle is removed. For example, in FIGURES 2 and 3 a closure plate 17 is hingedly connected to the top wall of the discharge conduit through the hinge 18. Plate 17, as shown, has an area which substantially closes the discharge opening when in the position of FIGURES 2 and 4. Plate 17 is illustrated as having an area somewhat less than the discharge opening so as to more readily accommodate itself to the receptacle which is attached to the discharge channel. Plate 17 may have the forward lower portion thereof cut away on a diagonal as shown at 19 in order to accommodate the angular disposition of the receptacle 12. When the receptacle 12 is not formed on an angle as illustrated in FIGURE 1, but extends in alignment with the discharge opening, the plate 17 may be made somewhat larger.

A latch lever 20 is pivotally mounted on plate 17 as at 21 and has a length such that it may extend above the top wall of the discharge conduit.

Lever 20 is confined for swinging movement about the axis of pivot 21 between a stop lug 22 and a second stop lug 23. Lug 22 allows the lever to be swung to an essentially upright and slightly inclined to the vertical position so that it will fall by gravity to the full line position of FIGURE 4 when the closure plate 17 is in the closed position. Lug 23 limits the downward swinging movement to this position and in this position, the upper end of the lever 20 is adjacent and abuttable against lug 16a to prevent opening of the closure plate.

In use, the hinge plate 18 is easily bolted or screwed to the upper portion of the discharge conduit 11. In one position of the closure plate, as when a receptacle is not attached to the discharge conduit, the plate overlies a substantial portion of the opening of the discharge conduit and closes the same.

When the receptacle is removed from the discharge conduit, the plate 17 swings by gravity to this position. In this position, the force of gravity moves the lever to the dotted line position of FIGURE 2.

It should be noted that the plate is illustrated as closing a substantial portion of the discharge opening while leaving a minor portion of the discharge opening in the lower portion thereof unclosed. The plate may, of course, be made to close the entire discharge opening or may be made somewhat smaller to accommodate particular configurations of receptacles or bags that are attached to the discharge opening, since the plate in the open position must extend within the receptacle or bag.

Figure 2:
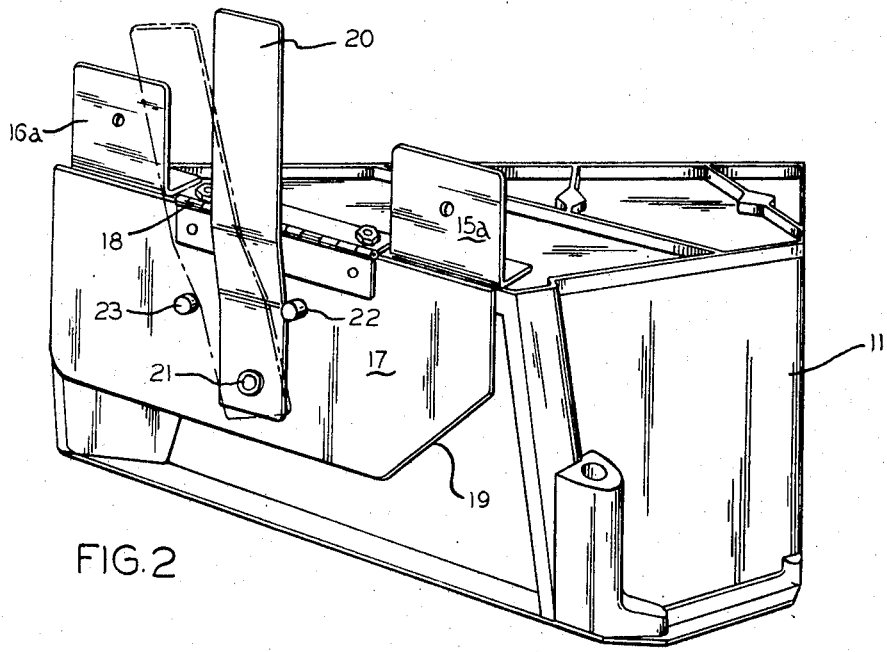
FIGURE 2 is a perspective view of a portion of the mower illustrated in FIGURE 1 and particularly illustrating the discharge conduit thereof when provided with the deflector and guard plate of the present invention.
Figure 3:
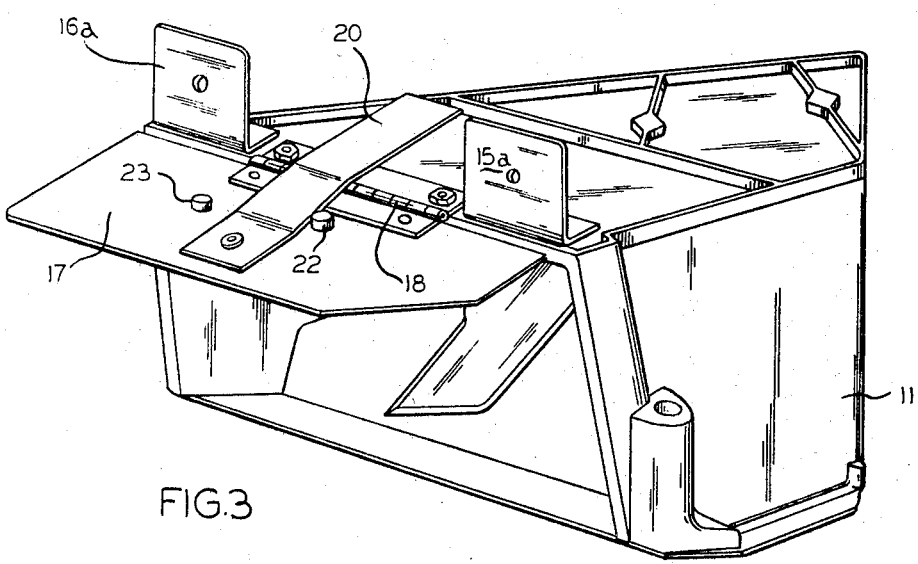
FIGURE 3 is a perspective view similar to FIGURE 2 but illustrating the guard and deflector plate in a different position.

In the position of FIGURE 2, the latch and manipulating lever 20 simply rests by gravity against the stop 23. In this position it overlies one of the receptacle attaching lugs 16a. This locks the plate in the closed position. In this position, the closure plate effectively acts as a guard for the discharge opening.

Figure 5:
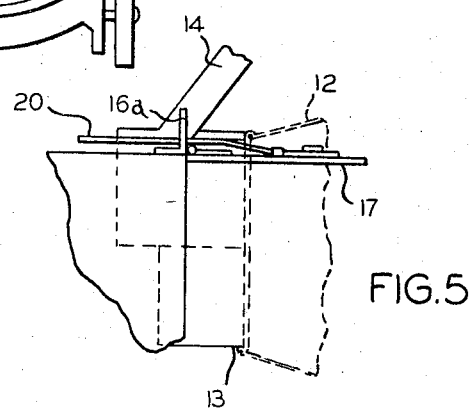
FIGURE 5 is a sectional view of the discharge conduit illustrated in FIGURES 2, 3 and 4 with the receptacle attached to the discharge conduit and illustrating the guard and deflector plate in the open position.
Figure 4:
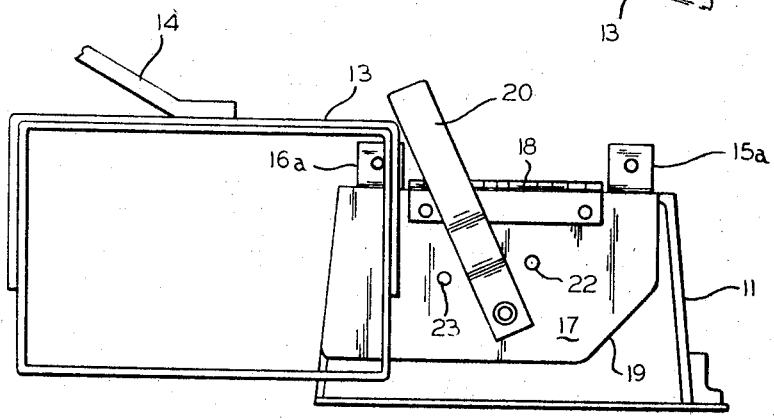
FIGURE 4 is a side view illustrating operation of the receptacle to move the guard and deflector plate to the open position.

When a receptacle is again fitted over the discharge opening, the frame at the mouth end of the receptacle, as illustrated at 13 in FIGURES 1 and 4 may be used to simply nudge the lever 20 away from an abutting relation to the lug 16a. The frame 13 may then push lever 20 inwardly toward the mower so that the frame, when fitted over the lugs 15a and 16a and dropped in position, forces the closure plate and latch lever to the open position of FIGURES 3 and 5. In this open position the plate extends within the receptacle while leaving the discharge opening unobstructed.

Figure 6:
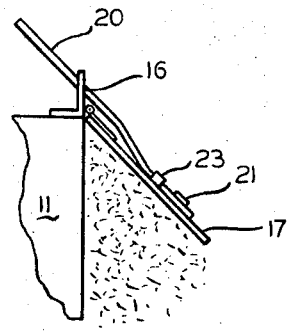
FIGURE 6 is a sectional illustration of the mower discharge conduit illustrating a still further operative position of the guard and deflector plate.

In certain circumstances, the operator of the mower may wish to windrow clippings. In this event, the bag or receptacle is detached from the discharge conduit, the latch lever 20 is moved over to the central position and out of engagement with the lug 16 and in this position the flow of air through the discharge conduit at normal or high running speeds will be sufficient to force the plate to a position making an angle of approximately 45° with the discharge opening. This is illustrated in FIGURE 6. In this position, the plate serves to deflect clippings downwardly and precludes them from being thrown a relatively long distance from the mower. At the same time, the plate serves to restrict any upward and outward movement of clippings or other objects from the discharge conduit. In other words, in this position, the plate has both a partial guarding function and a partial deflecting function. When in this inclined position, the lever 20 is between the upstanding lugs so that it cannot move to the locked position unless the air flow through the discharge conduit stops, as when the mower stops. When this happens, the plate 17 automatically drops to the closed position and the lever 20 falls into the locked position.

I claim:

1. In a rotary lawn mower of the type having a discharge opening directed through one side of a mower housing from a cutting space within the housing and wherein the discharge opening is defined through a conduit having wall portions defining the opening, the improvement comprising a closure plate pivotally mounted on one wall portion defining the discharge openings, said closure plate being formed and adapted to close a substantial portion of said opening in one position thereof and to be pivoted away from said opening so that discharge from said opening is substantially unobstructed, a lug on said wall portion defining said opening, said plate having a lever movably mounted on the outer side thereof and biased toward a position in overlying and abutting relation to said lug, means for limiting movement of said lever to said position, said lever being positioned to overlie said wall portion of said discharge wall portion in another position of said lever to allow said plate to be moved to an open position out of the path of movement of clippings through said opening.

2. The structure of claim 1 wherein said lever is pivotally mounted on said plate and confined for movement between a position at a small angle to the vertical and said first named position at a larger angle to the vertical whereby the lever may move by gravity to said first named position.

3. The structure of claim 1 wherein said plate is pivoted at an upper wall portion of said discharge conduit and is of stock light enough to be moved by a high velocity discharge air stream of the mower to a windrowing position between the closed and open positions of said plate.

4. The structure of claim 1 wherein said means for limiting movement of said lever includes a stop positioned on said plate and in the path of movement of said lever to said position, said plate having another stop limiting movement of said lever to said other position.

References Cited

UNITED STATES PATENTS

| 2,984,850 | 5/1961 | Law et al. | 56—202 X |
| 3,132,457 | 5/1964 | Slemmons | 56—202 |
| 3,186,152 | 6/1965 | Epstein | 56—202 |

LUCIE H. LAUDENSLAGER, *Primary Examiner.*

U.S. Cl. X.R.

56—25.4